United States Patent [19]

O'Connor et al.

[11] Patent Number: 4,491,617
[45] Date of Patent: Jan. 1, 1985

[54] REINFORCING COMPOSITE FOR ROOFING MEMBRANES AND PROCESS FOR MAKING SUCH COMPOSITES

[75] Inventors: Terry J. O'Connor; Ian G. Cooper, both of St. Catharines, Canada

[73] Assignee: Bay Mills Limited, St. Catharines, Canada

[21] Appl. No.: 444,215

[22] Filed: Nov. 24, 1982

[51] Int. Cl.³ .............................................. B32B 5/06
[52] U.S. Cl. .................................... 428/236; 156/282; 428/247; 428/251; 428/252; 428/253; 428/255; 428/285; 428/287
[58] Field of Search .............. 428/236, 247, 251, 252, 428/253, 255, 285, 287, 288; 156/282

[56] References Cited

U.S. PATENT DOCUMENTS 3,940,534  2/1976  Fick ....................................... 428/251
3,993,828  11/1976  McCorsley ........................... 428/251
4,368,228  1/1983  Gorgati ................................ 428/110

FOREIGN PATENT DOCUMENTS 711219  6/1965  Canada ................................. 428/251

Primary Examiner—Marion E. McCamish
Attorney, Agent, or Firm—Fitzpatrick, Cella, Harper & Scinto

[57] ABSTRACT

A reinforcing composite for bituminous roofing membranes is made by laminating fiberglass and polyester mats and scrims coated with selected adhesives.

20 Claims, No Drawings

REINFORCING COMPOSITE FOR ROOFING MEMBRANES AND PROCESS FOR MAKING SUCH COMPOSITES

BACKGROUND OF THE INVENTION

1. Field of the Invention

This invention relates to a composite for use in reinforcing roofing membranes made from bituminous materials. The use of this invention by manufacturers of such membranes results in significantly easier processing with less-complicated equipment. Moreover, sufficient strength in the roofing membranes can be achieved with less reinforcing material than previously used. The membranes can also be made significantly thinner, which is not only a saving in the amount of bituminous raw material required and a reduction in the weight load on the roof after installation, but also increases flexibility so that handling during installation involves a decreased risk of creating cracks or other weaknesses which could lead to leaks.

2. Description of the Prior Art

Asphalt-like roofing membranes, such as those which are used on flat roofs, have been made from bituminous materials reinforced with three separate layers of reinforcing materials: polyester mat, non-woven fiberglass scrim held together with a thermosetting adhesive, and fiberglass mat. Other combinations of separate layers used previously have included (a) fiberglass mat and fiberglass scrim, (b) fiberglass mat and polyester scrim, and (c) polyester mat and fiberglass scrim. These reinforcing layers have been unwound from their respective separate rolls and led together through a tank or vat of heated bituminous material using methods which are known in the art. We are using "mat" in its usual meaning of an entangled mass of filaments and "scrim" in its usual meaning of an open fabric. The bituminous material has been a "modified bitumen" such as asphalt combined with about 20% by weight of atactic polypropylene or 5 to 15% styrene butadiene styrene rubber. The bituminous material has acted as an adhesive to hold the layers within the membrane. In addition, we have suggested replacing the polyester mat in the combination of polyester mat, fiberglass scrim, and fiberglass mat with a composite polyester layer consisting of a polyester scrim coated with polyvinyl chloride bonded to a light weight polyester mat; we understand that such a roofing membrane has been made and sold for more than a year.

SUMMARY OF THE PRESENT INVENTION

Our invention comprises making a single reinforcing composite of at least one layer of fiberglass, at least one layer of polyester, and at least a third layer which is fiberglass or polyester. Furthermore, these materials are formed such that at least one of them is in the form of a mat, at least one is in the form of a scrim coated with a thermoplastic adhesive, and at least a third layer is in the form of a mat or a scrim.

These layers are bonded together by thermoplastic adhesive under pressure to form a single, thin composite which is useful for reinforcing roofing membranes.

Our process and the composite made from it have several advantages over the prior art, including the following. By combining the various reinforcing elements as we describe, the thickness and weight of each layer can be reduced because each one need not be self-supporting when it is subjected to stress at the time it is unwound and bituminous material is applied. Moreover, the composites of this invention have a reduced total thickness for the reinforcing layer, which results in less bituminous material being required. This reduction in material not only cuts costs, but increases ease of handling and reduces roof-loads when installed. The thinner reinforcing membrane and the resulting reduction in overall thickness also gives additional significant advantages beyond reduction in materials and weight. A thinner roofing membrane is less likely to crack or develop weaknesses during installation which could lead to leaks when it is made into rolls and stored, transported, unrolled, and applied to roofs. This is particularly important in winter in colder climates. A single reinforcing element also results in easier processing for the manufacturer, who need not be concerned with aligning separate reinforcing elements while they are led to and through the vats of hot bituminous material.

In reinforcing composites of this invention, if two glass components are used, we prefer to place them side by side. Mats are preferably used on the outside of the composite, as this tends to prevent scrims from separating in later processing.

Fiberglass has advantageous properties of tensile strength, thermal dimensional stability, and resistance to wear and deterioration such as may be due to ultraviolet light. Polyester mat and scrim are tear resistant. The scrims used in this invention are coated with a thermoplastic adhesive such as polyvinyl chloride ("PVC") latex adhesive or PVC plastisol adhesive. Thermoplastic adhesive on the scrim binds layers of the composite together. The fiberglass scrim is preferably a non-woven, adhesive bonded scrim, though it may be a woven or a weft-inserted warp knit fabric. We prefer that the fiberglass yarns range from 150 1/O (15000 yards/pound) to 75 1/O or heavier, up to 18 1/O. The weight of the fiberglass scrim (including adhesive) we prefer may range from 1 ounce per square yard (34 g/m$^2$) to 7 ounces per square yard (238 g/m$^2$), with weights of about 5 ounces per square yard (170 g/m$^2$) being optimal. Adhesives are preferably used in the proportion of 30 parts (by weight) of adhesive to 100 parts (by weight) of yarn up to 250 parts of adhesive to 100 parts of yarn. The polyester scrim may preferably range in weight between 1 (34) and 5 ounces per square yard (170 g/m$^2$) (including adhesive) made of threads of 200 to 3000 denier, with 500 to 2000 denier being preferable and 1000 denier threads being most perferred. The weight of adhesive used may range between 30 and 250 parts (by weight) to 100 parts (by weight) with the preferred range being 100 to 160 parts of adhesive.

Preferred adhesives are polyvinyl chlorides such as PVC plastisol (PVC dispersion in plasticizer), and PVC latex, having melting temperatures ranging from 275° (135°) to 425° F. (220° C.). Other forms of polymeric resins such as acetates and acrylics may be used, as may other thermoplastic adhesives.

The polyester mat may be a paper laid mat of staple filaments or preferably spun bonded of continuous filaments, and preferably having isotropic properties. The weight of the mat is preferred at 0.4 (14) to 1.0 (34 g/m$^2$) ounces, though weights up to about 6 ounces per yard (204 g/m$^2$) may be used. The fiberglass mat may be formed on a paper machine (by what is known as a wet process), or it may be a resin-bonded (a so-called dry process) staple or continous filament mat and is preferably isotropic. The fiberglass mat may preferably range in weight from 30 grams to 300 grams per square meter, with 30 to 100 grams being more preferred and 30 to 45 considered optimal.

In the process of laminating the various components of the reinforcing composite of this invention, increased strength may be obtained if all components except any fiberglass mat are unrolled and led to a hot nip where heavy pressure is applied and then led to a second hot nip where the fiberglass mat is added using lighter pressure. Alternatively, the fiber glass mat may be added as part of a single pass through a single hot-nip. When using a single hot-nip or the first nip when adding fiberglass mat in a second later step, the nip may consist of a heated steel roll and a resilient roll pressed together to give a working pressure at the nip preferably of 50 to 500 pounds per linear inch ("PLI") with the most preferred range being 150 to 250. A preheating roll may be used. The temperature of the preheat and heated rolls, and the running speed may be adjusted readily by those skilled in the art to obtain maximum adhesion between the various components. The composite may then be cooled by passing it through air or over a water cooled roll and wound for shipment or for further processing to add a fiberglass mat. When added in at second later hot nip, fiberglass mat may preferably be added using comparable temperatures and speeds but the working pressure may preferably be in the range of 25 to 75 PLI.

The composites of this invention are suitable for reinforcing a roofing membrane made, for example, by running the reinforcing composite through a tank or vat of hot modified bitumen with thickness controlled by metering rolls or doctor blades. The finished product is suitable for application by hot mopping, torching, cold adhesive, or other appropriate methods. It may be loose laid or mechanically fastened to the roof.

The following examples will illustrate the invention.

EXAMPLE 1

Fiberglass scrim having 5×7 yarns per 1 inch (5 yarns in the machine direction and 7 in the cross machine direction) of 37 1/0 fiberglass yarn weighing 2.0 oz/sq. yd. and coated with 0.7 oz/sq. yd. of PVC latex adhesive, polyester scrim having 4×4 yarns/inch of 1000 denier high tenacity polyester yarn weighing 1 oz/sq. yd. and coated with 1.3 oz/sq. yd. of PVC plastisol adhesive, and a continous filament spunbonded polyester mat weighing 0.6 oz/sq. yd. were unrolled and fed over a preheat roll (at 320° F.), then through a heated nip (380° F.) at 150 PLI.

EXAMPLE 2

A fiberglass mat of 40 grams per square meter, and a fiberglass scrim, polyester scrim, and polyester mat each as described in Example 1, were fed over a preheat roll (at 320° F.), then through a heated nip (380° F.) at 150 PLI.

EXAMPLE 3

Polyester mat and fiberglass scrim as described in Example 1 and fiberglass mat as described in Example 2 were fed over a preheat roll (at 320° F.), then through a heated nip (380° F.) at 150 PLI.

EXAMPLE 4

Polyester mat, fiberglass scrim, polyester scrim, and polyester mat, all as described in Example 1, were fed over a preheat roll (at 320° F.), then through a heated nip (380° F.) at 150 PLI.

EXAMPLE 5

Polyester mat as described in Example 1, fiberglass scrim having 4×2 yarns/inch of 150 1/0 fiberglass yarn in the machine direction and 75 1/0 in the cross-machine direction, weighing 0.3 ounces/sq. yd. and coated with 0.2 oz/sq. yd. of PVC latex adhesive, and a continous filament spunbonded polyester mat weighing 6 oz/sq. yd. were fed over a preheat roll (at 320° F.), then through a heated nip (380° F.) at 150 PLI.

EXAMPLE 6

Polyester mat of Example 1, polyester scrim of Example 1, and fiberglass mat of Example 2 were fed over a preheat roll at 320° F., then through a heated nip at 380° F. and 250 PLI.

In each of the above examples the process produced a reinforcing, impregnatable composite for use in roofing membranes.

EXAMPLE 7

A composite of polyester scrim and polyester mat was combined with a fiberglass scrim using a hot nip, the composite being thinner and having a lighter weight than the three elements as used separately in the prior art. The roofing membrane was made by unrolling this composite and a fiberglass mat from two separate rolls and leading them together through a tank of hot modified bitumen.

We claim:

1. A composite for reinforcing roofing membranes comprising three layers one of which is made of fiberglass, one of which is made of polyester, and the third of which is made of either polyester or fiberglass; at least one of which is in the form of a scrim coated with a thermoplastic adhesive, one of which is in the form of a mat, and a third of which is in the form of a mat or a scrim; wherein the composite is flexible, capable of being impregnated by a bituminous material, and has sufficient strength to be useful in reinforcing roofing membranes.

2. The composite of claim 1 in which the layers are fiberglass scrim, a polyester scrim, and a polyester mat.

3. The composite of claim 1 in which the layers are a fiberglass mat, a fiberglass scrim, a polyester scrim, and a polyester mat.

4. The composite of claim 1 in which the layers are a polyester mat, a fiberglass scrim, and a fiberglass mat.

5. The composite of claim 1 in which the layers are a polyester mat, a fiberglass scrim, a polyester scrim, and a polyester mat.

6. The composite of claim 1 in which the layers are a polyester mat, a fiberglass scrim, and a polyester mat.

7. The composite of claim 1 in which the layers are a polyester mat, a polyester scrim, and a fiberglass mat.

8. The composite of claim 1 which consists essentially of three layers.

9. The composite of claim 8 in which the outside layers are both mats.

10. The composite of claim 1 which consists essentially of four layers.

11. The composite of claim 10 in which the outside layers are both mats.

12. The composite of claim 1 in which the outside layers are both mats.

13. The composite of claim 1 in which one of the layers is a polyester mat weighing about 14 to about 34 grams per square meter.

14. The composite of claim 1 in which one of the layers is a fiberglass mat of about 30 to about 45 grams per square meter.

15. The composite of claim 1 in which the thermoplastic coating has a melting temperature of from about 135° C. to about 220° C.

16. The composite of claim 1 in which said adhesive is present in the amount of 30 to 250 parts by weight to 100 parts by weight of the scrim.

17. The composite of claim 1 in which the three layers are bonded together by said thermoplastic adhesive.

18. The composite of claim 1 wherein the three layers are formed into a single, thin layer by passing them through a hot nip at sufficient temperature and pressure to cause the thermoplastic adhesive to soften and bind the layers together.

19. A process for making a composite to use in reinforcing roofing membranes comprising the steps of:
   selecting at least three materials, one of which is fiberglass, one of which is polyester, and the third of which is fiberglass or polyester; one of which is in the form of a scrim coated with a thermoplastic adhesive, one of which is in the form of a mat, and the third of which is in the form of either a mat or a scrim;
   passing these layers through one or more hot nips to heat the thermoplastic adhesive and bind the layers together; and
   cooling the composite thus created;
   wherein, the resulting composite is flexible, capable of being impregnated by bituminous material, and has sufficient strength to be useful in reinforcing roofing membranes.

20. The process of claim 19 in which at least one of the outside layers is selected as a fiberglass mat and comprises the additional steps of passing all materials except the fiberglass mat through a first hot nip and adding the fiberglass mat to the other materials by passing them together through a second hot nip in which the pressure per linear inch is in the range of 25 to 75 pounds per linear inch.

* * * * *

UNITED STATES PATENT AND TRADEMARK OFFICE
CERTIFICATE OF CORRECTION

PATENT NO. : 4,491,617

DATED : January 1, 1985

INVENTOR(S) : Terry J. O'Connor and Ian G. Cooper

It is certified that error appears in the above-identified patent and that said Letters Patent is hereby corrected as shown below:

Column 3, line 28, Add at the end of the second paragraph and before the paragraph starting with the "The composite etc." the paragraph --In specifying PLI, we are referring to rolls between 10 and 30 inches in diameter.--.

Signed and Sealed this

Eleventh Day of June 1985

[SEAL]

Attest:

DONALD J. QUIGG

Attesting Officer     Acting Commissioner of Patents and Trademarks